Nov. 1, 1960 E. J. PETHERICK 2,958,860

DIGITAL ENCODERS

Filed Aug. 1, 1956 4 Sheets-Sheet 1

Inventor
EDWARD JOHN PETHERICK
By
Stevens, Davis, Miller & Mosher
Attorneys

Nov. 1, 1960 E. J. PETHERICK 2,958,860

DIGITAL ENCODERS

Filed Aug. 1, 1956 4 Sheets-Sheet 2

Inventor
EDWARD JOHN PETHERICK
By
Stevens, Davis, Miller & Mosher
Attorneys

Nov. 1, 1960

E. J. PETHERICK 2,958,860

DIGITAL ENCODERS

Filed Aug. 1, 1956

4 Sheets-Sheet 3

Inventor
EDWARD JOHN PETHERICK
By Stevens, Davis, Miller & Mosher
Attorneys

Nov. 1, 1960 E. J. PETHERICK 2,958,860

DIGITAL ENCODERS

Filed Aug. 1, 1956

4 Sheets-Sheet 4

Inventor
EDWARD JOHN PETHERICK
By
Stevens, Davis, Miller & Mosher
Attorneys

United States Patent Office 2,958,860

Patented Nov. 1, 1960

2,958,860

DIGITAL ENCODERS

Edward John Petherick, Rowledge, near Farnham, England, assignor to National Research Development Corporation, London, England, a corporation of Great Britain Filed Aug. 1, 1956, Ser. No. 601,573

Claims priority, application Great Britain Aug. 15, 1955

24 Claims. (Cl. 340—347)

The present invention relates to digital encoders of the type which represent positional information by means of electrical signals in accordance with a predetermined digital code.

When it is desired to represent the rotational position of a shaft not only during one complete revolution of the shaft but also during a number of complete revolutions of the shaft, two coded commutators may be used. One of these commutators, the fine commutator (or the means for reading that commutator), is rotated directly with the shaft to provide a digital representation of the rotational position of the shaft within one complete revolution. The other commutator, the coarse commutator, may be geared to the shaft to provide, together with the fine commutator, a digital representation of the rotational position of the shaft over a number of complete revolutions of the shaft.

However, when gears are used between the coarse commutator and the shaft, backlash may occur between the gear wheels. This may result in an incorrect reading of the coarse commutator.

It is an object of the present invention to provide a digital encoder having a coarse commutator and which is capable of reducing the effects of backlash in gears driving the coarse commutator.

According to the present invention, there is provided a digital encoder including a coarse commutator having a plurality of tracks thereon each marked with a succession of code elements in accordance with a predetermined code, intermediate output means adjacent the coarse commutator for providing intermediate outputs dependent on the positional relationship between the intermediate output means and the coarse commutator, gear means for driving the coarse commutator at a speed different from that of the intermediate output means and selector means adjacent the intermediate output means for selecting the intermediate outputs according to the position of the intermediate output means relative to a datum position so as to provide final outputs indicative of the said position of the intermediate output means.

According to a feature of the present invention, there is provided a digital encoder including a shaft, a coarse commutator mounted for rotation about the longitudinal axis of the shaft and having a plurality of tracks marked thereon each marked with a succession of code elements in accordance with a predetermined code, gear means connecting the shaft to the coarse commutator and arranged to rotate the coarse commutator about the longitudinal axis of the shaft at a speed different from the speed of rotation of the shaft, intermediate output means driven directly by the shaft for providing intermediate outputs dependent upon the rotational position of the shaft and selector means for selecting the intermediate outputs according to the rotational position of the shaft so as to provide final outputs indicative of the rotational position of the shaft.

According to further features of the present invention, the coarse commutator comprises a copper disc, having on one face thereof, annular tracks marked with the code elements by etching to form lands and depressions, the depressions being filled with a non-conductive material. The intermediate output means may comprise a brush carrier carrying brushes bearing on the various tracks of the coarse commutator so as to provide the intermediate outputs. The brush carrier also carries further brushes which are connected one to each of the brushes bearing on the commutator tracks. These further brushes bear on stationary commutative slip rings each of which conforms to only part of a circle so that an intermediate output is taken from any one brush over only a portion of one complete rotation of the shaft. Thus, the further brushes and the commutative slip rings may form the selector means referred to above.

In order that the invention may be more clearly understood, an embodiment thereof will now be described, by way of example, with reference to the accompanying drawings, in which.

Figure 1:
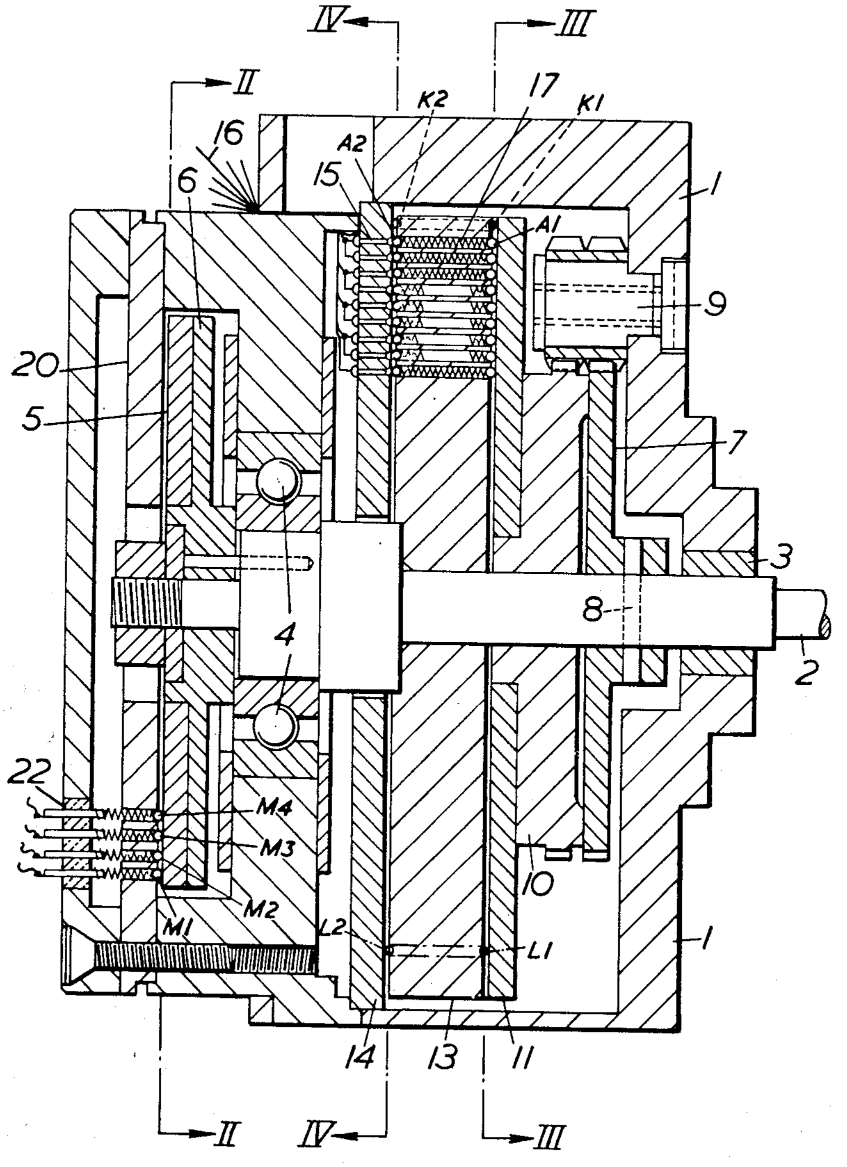
Figure 1 is a sectional view of a digital encoder.

Figure 1 shows a digital encoder comprising a main body member 1 which supports a shaft 2 in bearings 3 and 4. The shaft carries a fine commutator 5 upon a supporting disc 6. Brushes, in the form of ball-bearings M1, M2, M3 and M4, bear on the surface of the commutator 5. Outputs are taken from these brushes through an insulating block 22. The shaft 2 also carries a gear-wheel 7 which is caused to rotate with the shaft 2 by means of a pin 8 which extends diametrically through the shaft 2 and through a flange on the gear-wheel 7. The gear-wheel 7 has ninety teeth on its circumference and these teeth engage with a toothed pinion 9 which is rotatable about an axle attached to the main body member 1. Another gear-wheel 10 is freely mounted for rotation upon the shaft 2. The gear-wheel 10 has one hundred teeth on its circumference and these teeth also engage with the toothed pinion 9. Therefore, for every ten complete rotations of the shaft 2 (which is equivalent to a similar ten complete rotations of the gear-wheel 7) the gear-wheel 10 will rotate completely only nine times. Preferably, the toothed pinion 9 is provided with two sets of teeth, one set to engage with gear-wheel 7 and the other set to engage with the gear-wheel 10. However, it may be possible in some circumstances, to arrange one set of teeth on the pinion 9 so as to engage satisfactorily with both of the gear-wheels 7 and 10.

The gear-wheel 10 carries a coarse commutator 11 so that this commutator rotates with the gear-wheel 10. A brush carrier 13 is mounted upon the shaft 2 so as to be rotated directly by the shaft. It follows that for every ten rotations of the shaft 2 the brush carrier 13 will rotate one complete rotation with respect to the coarse commutator 11. On the side of the brush carrier 13 remote from the course commutator 11 there is mounted, in fixed relationship to the body member 1, a slip ring carrier 14. The slip ring carrier carries slip rings to be described in greater detail with reference to Figure 4 whilst the commutators 5 and 11 will be described hereinafter in greater detail with reference to Figures 2 and 3 respectively.

Outputs from the slip rings are provided by means of rivets (such as that indicated at 15) and insulated wires (such as that indicated at 16).

The brush carrier 13 has nine cylindrical holes bored through it along one radius of the carrier. These holes have their longitudinal axes parallel to the shaft 2. A pair of ball-bearings, such as the ball-bearings indicated at A1 and A2 are located in each hole and each such pair are held apart by means of a helical spring such as the spring indicated at 17. The ball-bearings are, therefore, held in contact with the coarse commutator 11 and the slip rings respectively by means of the springs. The spacing of the holes from one another along the radius and the co-operation of the ball-bearings with the slip rings and the coarse commutator will be described hereinafter with reference to Figures 3 and 4. Additionally, there is provided in the brush carrier 13 two further and similar holes with their associated ball bearings K1 and K2 and springs. The location of these ball bearings K1 and K2 in relation to the other ball bearings will also be described hereinafter with reference to Figures 3, 4 and 5 of the drawings.

The commutators 5 and 11 are coded in accordance with a cyclic permuting binary-decimal code of a type described in co-pending patent application No. 478,031. In this code, the cyclic permuting decimal digits representing a normal decimal number are obtained by substituting for a digit in the normal decimal number, the complement on nine of the digit whenever the immediately preceding digit of greater significance in the normal decimal number is odd. Thus, the normal decimal numbers 0 to 21 would be represented in the cyclic permuting decimal code as 00, 01, 02, 03, 04, 05, 06, 07, 08, 09, 19, 18, 17, 16, 15, 14, 13, 12, 11, 10, 20 and 21 respectively. In the cyclic permuting binary-decimal code, each digit of a cyclic permuting decimal code is represented in a cyclic permuting manner by four binary digits. Three of the four binary digits (referred to hereinafter as the X, Y and Z binary digits) define by means of five different combinations, five pairs of decimal digits, each pair consisting of a digit less than five and that digit's complement on nine. The fourth binary digit (hereinafter referred to as the W binary digit) defines which digit of any pair of decimal digits is the cyclic permuting decimal digit represented by the binary code. That is to say, the W binary digit indicates whether the cyclic permuting decimal digit represented by the four-digit binary code is greater than four or less than five. One particular binary code is used on the commutators shown in the drawings. This code may be shown to be basically the same as other possible four-digit binary codes having these properties and the property that an odd number of binary digits represents an odd decimal digit. The code is set forth in the following table.

| Cyclic Permuting Decimal Digit Represented | Binary Code | | | |
|---|---|---|---|---|
| | W | X | Y | Z |
| 0 | 0 | 1 | 0 | 1 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 1 | 1 | 1 | 0 |
| 6 | 1 | 0 | 1 | 0 |
| 7 | 1 | 0 | 1 | 1 |
| 8 | 1 | 0 | 0 | 1 |
| 9 | 1 | 1 | 0 | 1 |

The embodiment illustrated in Figures 1 to 5 is designed to indicate the rotational position of the shaft 2, in the cyclic permuting binary-decimal code hereinbefore described, in tenths of a revolution for a maximum of ten revolutions. For this purpose, the fine commutator 5 and the coarse commutator 11 are each divided notionally into ten equal sectoral divisions. Thus, each division subtends an angle of thirty-six degrees at the centre of the commutator. In the case of the coarse commutator, it follows that it will rotate relative to the brush carrier one division for each complete rotation of the shaft 2. The fine commutator 5 is employed partially to define the least significant digit of the cyclic permuting binary-decimal code (corresponding to the least significant digit of the corresponding normal decimal number) representing the number of tenths of a revolution the shaft 2 has rotated. However, because the fine commutator 5 has only ten divisions, it is not possible to represent all four binary digits on this commutator, but only the X, Y and Z binary digits. If the fourth binary digit W were represented on the fine commutator 5, the reading from the commutator would return to 0101 (i.e. zero) every turn of the shaft 2 and the output from the coarse and the fine commutators would not be cyclic permuting. The binary digit W is, therefore, represented on the coarse commutator. As a general rule, the W binary digit in the representation of the most significant cyclic permuting decimal digit represented on the fine commutator should be transferred to the coarse commutator (and marked thereon) wherever the number of fine divisions on the fine commutator are $(2m+1)10^n$ in number, where $m$ and $n$ are integers. It should be noted, however, that if the fine-commutator were to be marked so that each division represented, say, one-twentieth of a revolution (that is to say, the number of fine divisions is $2m\ 10^n$) the necessity of removing the W binary digit from the fine commutator to the coarse commutator would not be present.

Figure 2:
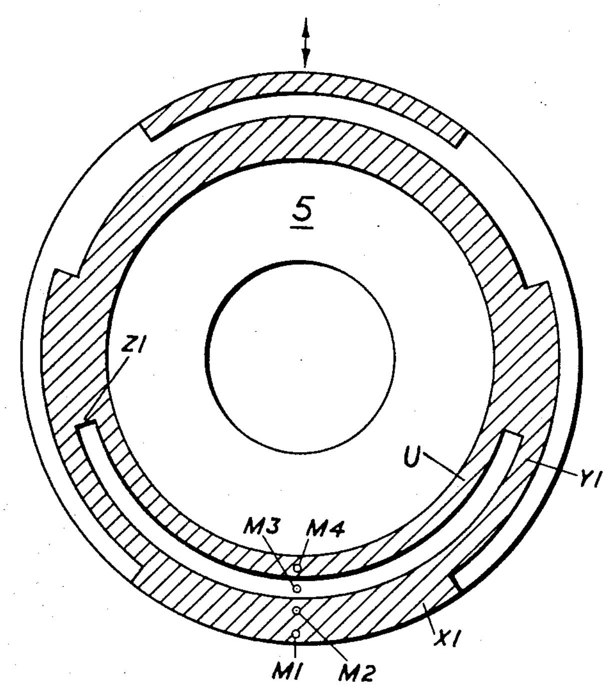
Figure 2 is an elevation view of a fine commutator, which forms part of the digital encoder, corresponding to a view taken from the line II—II in Figure 1.

Figure 2 shows the fine commutator 5. The commutator comprises a copper disc having four annular tracks X1, Y1, Z1 and U on each of which bears a brush comprising one of four ball-bearings M1, M2, M3 and M4 (shown superimposed on the view of the commutator) respectively. Outputs are taken separately from the ball-bearings M1, M2 and M3. The annular tracks X1, Y1, Z1 and U are formed by etching the copper disc to form depressions and lands. The depressions are then filled with a suitably hard non-conductive resin. The lands are shown cross-hatched in the drawing. The centre portion of the commutator is not shown cross-hatched for the sake of clarity. The track U is a continuous land and is used in conjunction with the ball-bearing M4 to impart a positive voltage to the commutator disc. The ball-bearings M1, M2 and M3 pick off this positive voltage when they contact the lands on their respective tracks. Each land and, therefore, a positive voltage output from a ball-bearing, is arranged to represent a binary digit 1. Each depression and, therefore, zero voltage output from a ball bearing, is arranged to represent a binary digit 0. The ten sectional divisions of the fine commutator are coded in this manner with the X, Y and Z binary digits (on the tracks X1, Y1 and Z1 respectively) of the cyclic permuting binary-decimal code representing successively the pairs of decimal digits 0/9, 1/8, 2/7, 3/6, 4/5, 4/5, 3/6, 2/7, 1/8 and 0/9. This results in the pattern on the commutator being symmetrical about and a diametrical line drawn through the ball-bearings when they are in the position relative to the commutator shown in the drawing.

The ball-bearings M1 and M4 are stationary so that as the commutator rotates, the outputs from the ball-bearings will vary according to the coding of the fine commutator. In the position shown, the ball-bearings M1 to M3 will yield potential outputs representing the binary digits 1, 1 and 0 respectively. This indicates that the least significant digit of the corresponding cyclic permuting decimal codes is a 4 or a 5 depending upon the output from the coarse commutator.

Figures 3, 4:
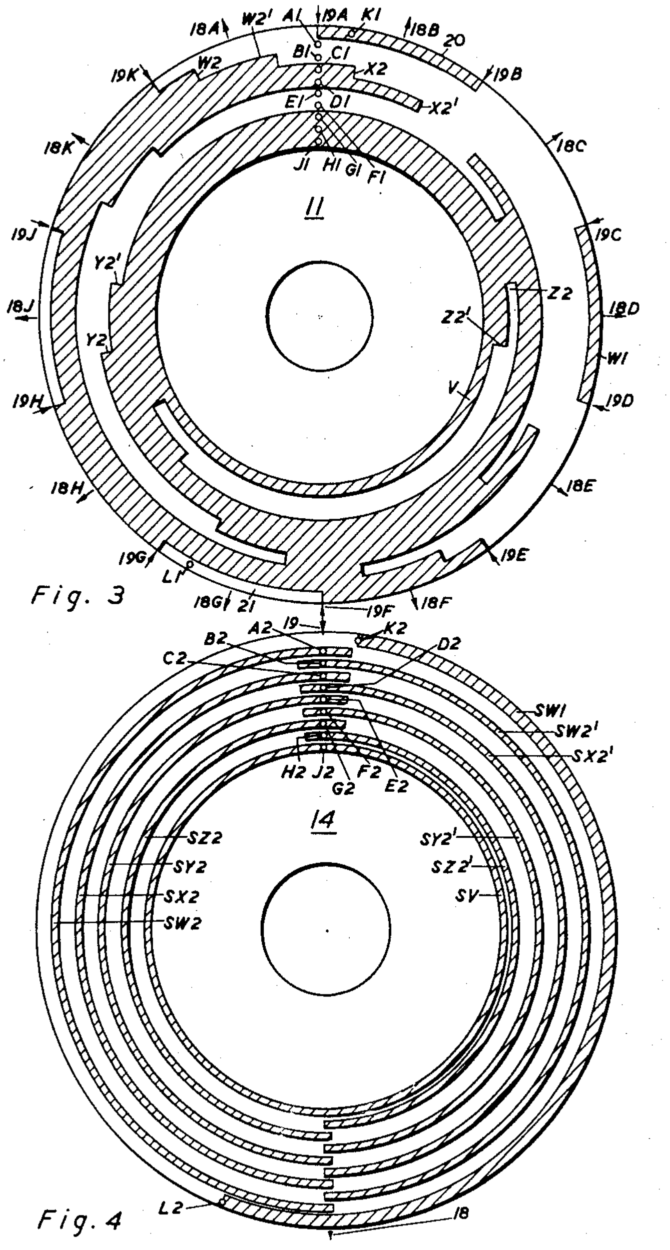
Figure 3 is an elevation view of a coarse commutator, which forms part of the digital encoder, corresponding to a view taken from the line III—III in Figure 1.
Figure 4 is a mirror image of an elevation view, corresponding to the mirror image of a view taken from the line IV—IV in Figure 1, of slip rings used for reading the coarse commutator shown in Fig. 3

The coarse commutator 11 is shown in Figure 3. It comprises a copper disc of similar construction to the fine commutator 5. That is to say, it has lands represented by cross-hatching and these lands represent the binary digits 1. The centre portion of the commutator has not been cross-hatched for the sake of clarity. The coarse commutator is notionally divided into ten equal sectoral divisions the boundaries of which are indicated by the positions of the outwardly-directed arrows 18A to 18K. The coarse commutator has ten annular tracks W1, W2, W2[1], X2, X2[1], Y2, Y2[1], Z2, Z2[1], and V on which bear brushes comprising ball-bearings K1 and L1, A1, B1, C1, D1, E1, F1, G1, H1 and J1 respectively. The track V and ball-bearing J1 are used continuously to apply a positive voltage to the commutator in a manner to be described with reference to Figure 4. The track W1 and the ball-bearings K1 and L1 are used to indicate the W binary digit representing, in conjunction with the tracks $X_1$, $Y_1$ and $Z_1$ on the fine commutator, the least significant cyclic permuting decimal digit. Their manner of operation will be described in detail hereinafter with reference to Figure 5.

The tracks W2, X2, Y2 and Z2 are constructed with lands and depressions so that the ball-bearings A1, C1, E1 and G1 provide an output representing the binary digits, W, X, Y, Z respectively. These binary digits represent one of the decimal digits 0 to 9 according to the position of the ball-bearings relative to the commutator. The decimal digits coded on the commutator increase progressively by unity from 0 to 9 back to 0 in a clockwise direction round the commutator.

However, the tracks W2, X2, Y2 and Z2 are displaced one-quarter of a division anticlockwise relative to the sectional division which they represent for the reasons explained hereinafter. The tracks W2[1], X2[1], Y2[1] and Z2[1] are similar to the tracks W2, X2, Y2 and Z2 respectively except that they are displaced by one half of a division in a clockwise direction relative to the tracks W2, X2, Y2 and Z2. By this means, one end of the land on the track W2 is made to fall short of a division boundary by one quarter of a division while the corresponding end of the land on the track W2[1] is made to overlap a division boundary by one quarter of a division. Similarly the other end of the land on the track W2 overlaps a division boundary by one quarter of a division while the corresponding end of the land on the track W2[1] falls short of a division boundary by one quarter of a division. Similar consideration apply to the positioning of the tracks X2, X2[1], Y2, Y2[1], Z2 and Z2[1].

In order to explain the functional relationship between these tracks, reference will now be made to Figure 4 which shows a mirror image of the slip ring carrier 14. This carrier carries a series of commutative slip rings SW1, SW2, SW2[1], SX2, SX2[1], SY2, SY2[1], SZ2, and SZ2[1] and a slip ring SV. These slip rings correspond to, and have the same length of radius as, the tracks W1, W2, W2[1], X2, X2[1], Y2, Y2[1], Z2, Z2[1], and V respectively. The commutative slip rings have been so termed in the specification and appended claims because each of them extends over only part of the traverse of its associated ball-bearing. Bearing on the slip rings are ball-bearings K2 and L2, A2, B2, C2, D2, E2, F2, G2, H2 and J2 respectively. The functions of the slip ring SW1 and the ball-bearings K2 and L2 will be explained hereinafter in detail with reference to Figure 5. The function of the slip ring SV and the ball-bearing J2 is to convey a positive voltage to the coarse commutator 11 via the ball-bearing J1 (Figure 3). It will be remembered from the description with reference to Figure 1, that ball-bearings such as these are connected together in the brush carrier 13 by means of springs which hold the ball-bearings in contact with the commutator and the slip ring carrier.

The ball-bearings K1 and K2, A1 and A2, B1 and B2 et cetera are connected together in a similar manner so that, for instance, when the ball-bearing A1 is on a land on the track W2 and the ball-bearing A2 is on the slip ring SW2, a positive voltage output will be obtained from the commutative slip ring SW2 (via the ball-bearing A2), but on no other occasion. The outputs from the commutative slip rings SW2 and SW2[1] are connected together. Similarly, the outputs from the commutative slip rings SX2 and SX2[1], SY2 and SY2[1] and SZ2 and SZ2[1] are connected together in pairs. The slip ring SW1 provides a further output. Therefore, only five separate outputs are taken from the slip rings.

Now the brush carrier 13 with its ball-bearings rotates at the same speed as the input shaft 2. The coarse commutator rotates at nine-tenths of this speed. Thus, if the shaft 2 is rotated in an anticlockwise direction, the ball-bearings will rotate in the same direction (that is to say, clockwise as shown in Figures 3 and 4, Figure 4 being a mirror-image). The coarse commutator 11 will also rotate in the same direction but will move anti-clockwise (as shown in Figure 3) relative to the ball-bearings at the rate of one division (one tenth of a revolution) for each revolution of the shaft 2. The slip ring carrier remains stationary. Therefore, the ball-bearings A2 to L2 rotate clockwise (as shown in Figure 4) relative to the slip rings at the speed of rotation of the shaft 2.

In Figure 3, the ball-bearings A1 to H1 lie opposite an inwardly directed arrow 19A which marks the mid-point between the division boundaries 18A and 18B. In Figure 4, the ball-bearings A2 to H2 are shown in their corresponding positions opposite the inwardly directed arrow 19. At this point all the ball-bearings A2 to H2 are on their respective slip rings. Outputs will, therefore, be taken from all the ball-bearings A1 to H1 on the coarse commutator. These outputs, taken in pairs, will yield voltages representing the binary digits 0101 which, in turn, represent the decimal digit 0. As the ball-bearings A2 to H2 rotate in a clockwise direction (in the sense of the drawing), the ball-bearings A2, C2, E2 and G2 will leave their respective slip rings, but the outputs taken from the ball-bearings B2, D2, F2 and H2 (corresponding to the ball-bearings B1, D1, F1 and H1 on the tracks W2[1], X2[1], Y2[1] and Z2[1]) will still represent the binary digits 0101. As the ball-bearings A2 to H2 rotate still further to the point indicated by the outwardly directed arrow 18, all of these ball-bearings will again be in contact with their respective slip rings because these slip rings overlap slightly at this point. The position of the ball-bearings A1 to H1 relative to the coarse commutator will be at a point opposite the outwardly directed arrow 18B (i.e. one-half of a division in a clockwise direction from the point opposite the inwardly directed arrow 19A). The outputs from the slip rings will, therefore still represent the binary digits 0101. However, if the ball-bearings A2 to H2 move a little further in a clockwise direction, the ball bearings B2, D2, F2 and H2 will leave their respective commutative slip rings SW2[1], SX2[1], SY2[1] and SZ2[1] and the outputs from the commutative slip rings SW2, SX2, SY2, and SZ2 will be taken from the commutator tracks W2, X2, Y2 and Z2 via the ball-bearings A1, C1, E1 and G1. The outputs from the slip rings will, therefore, now represent the binary digits 0001 (i.e. the decimal digit 1). Further rotation of the ball-bearings A2 and H2 will produce a similar sequence of events.

By analogy, it will be seen that as the shaft 2 rotates in an anticlockwise direction, output from the coarse commutator will be transferred from the tracks W2, X2, Y2 and Z2 to the tracks W2[1], X2[1], Y2[1] and Z2[1] when the ball-bearings A1 to H1 are in the regions of the inwardly directed arrows 19A to 19K whilst they will be transferred from the tracks W2[1], X2[1], Y2[1] and Z2[1] to the tracks W2, X2, Y2 and Z2 when the ball-bearings A1 to H1 are in the regions of the outwardly directed arrows 18A to 18K. Further, the binary digits change (by one binary digit) in each of the regions of the outwardly directed arrows 18A to 18K. It follows that the point on the slip ring carrier 14 indicated by the outwardly directed arrow 18 should be accurately located. Also, the overlap between the slip rings at this point should be as small as possible consistent with continuity of output from the pairs of slip rings. The location of the point on the slip ring carrier 14 indicated by the arrow 19 and the degree of overlap between the slip rings at this point is clearly not so critical, since no change of output occurs when the ball-bearings reach this point.

From the foregoing description it will be seen that the coarse commutator 11 may be displaced (due to backlash in the gears) up to nearly one-quarter of a division in either direction from the position it should be in theoretically (without backlash in the gears) without the output from the encoder on the W2, X2, Y2 and Z2 channels being adversely affected.

The construction and operation of the track W1 on the coarse commutator 11 will now be described. It will be seen from the table that if an attempt was made to represent this binary digit on the fine commutator 5, the output would represent a succession of five digits 1 followed by a succession of five digits 0. However, as explained hereinbefore, this output would not be the output required to satisfy the cyclic permuting decimal code since the output would represent in successive turns the decimal digits 0, 1, 2, 3, 4, 5, 6, 7, 8, 9, 0, 1, 2, and so on. Thus a succession of ten binary digits 1 alternating with ten binary digits 0 is the required output which cannot be obtained from only ten divisions on the fine commutator. Now, one division on the coarse commutator is equivalent to ten divisions on the fine commutator. Therefore, the track W1 on the coarse commutator comprises five lands interdigitated with five depressions each of which are one division long. These lands start in the middle of alternate divisions of the coarse commutator 11 at the points indicated by the inwardly directed arrows 19A, 19C, 19E, 19G and 19J and end at the points indicated by the inwardly directed arrows 19B, 19D, 19F, 19H and 19K respectively.

Outputs are taken from the track W1 by means of the ball-bearings K1 and L1. The ball-bearing K1 is arranged to bear on a land on the track W1 one-fifth of a division before it is required to provide an output when moving in a clock-wise direction relative to the commutator. The ball-bearing L1 is offset in an anti-clockwise direction by two-fifths of a turn, 144 degrees, plus two-fifths of a division (0.44 of a turn) from the ball-bearing K1. Therefore, when the ball-bearings are moving in a clockwise direction, the ball-bearing L1 leaves a land one-fifth of a division after any output is required from it. Outputs are taken from the ball-bearings K1 and L1 via the ball-bearings K2 and L2 by means of the slip ring SW1 (1.00–0.44=0.56 of a turn long) on the slip ring carrier 14 (Figure 4).

Figure 5:
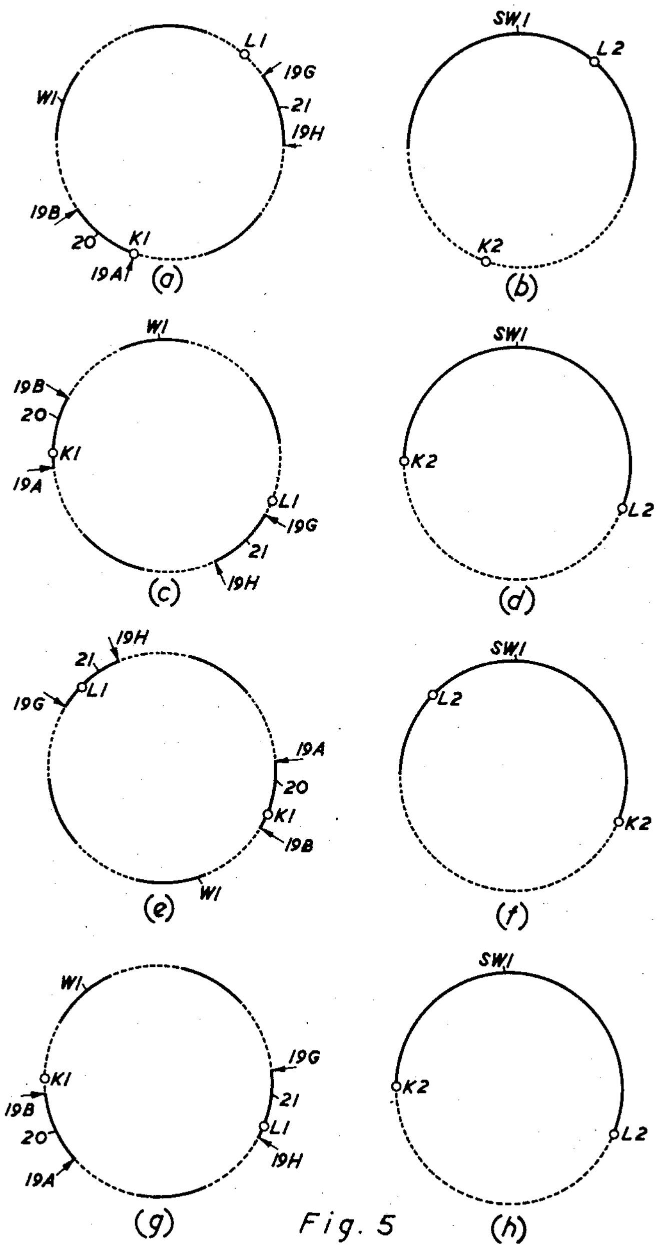
Figure 5 is a series of diagrams explanatory of the function of part of the digital encoder.

The operation of this part of the digital encoder will now be described with the aid of Figure 5 of the drawings. Figures 5(*a*), 5(*c*), 5(*e*) and 5(*g*) are diagrammatical representations of the commutator track W1 with its associated ball-bearings K1 and L1 in which the lands are represented by the full arcuate lines. Figures 5(*b*), 5(*d*), 5(*f*) and 5(*h*) are diagrammatic representations of the mirror image of the commutative slip ring SW1 with its associated ball-bearings K2 and L2.

Figure 5(*a*) shows the ball bearing K1 at the point indicated by the arrow 19A so that it just makes contact with a land 20. The ball-bearing L1 is shown in its corresponding position two-fifths of a division anticlockwise from the point indicated by the arrow 19G. Figure 5(*b*) shows the ball-bearing K2 one-fifth of a turn anti-clockwise off from one end of the commutative slip ring SW1. The ball-bearing L2 is on the slip ring SW1. The positions of the ball-bearings K1 and L1 relative to the commutator in Figure 5(*a*) corresponds to the positions of the ball-bearings K2 and L2 relative to the slip ring SW1 in Figure 5(*b*). There is, therefore, no positive voltage output from the commutative slip ring SW1 because there is no connection between the lands on the commutator through the ball-bearings to the slip ring.

Figures 5(*c*) and 5(*d*) show the ball-bearings K1 and L1 and K2 and L2 in corresponding positions after the ball-bearings K2 and L2 have completed one-fifth of a turn, in a clockwise direction (as shown in the drawing). These positions are the same as those illustrated in Figures 3 and 4. The ball-bearing K2 is just in contact with the slip ring SW1 which now provides a positive voltage output (via the ball-bearings K1 and K2) representing the binary digit 1.

Figures 5(*e*) and 5(*f*) show the ball-bearings K1 and L1 and K2 and L2 in corresponding positions after the ball-bearing K2 has completed a further 0.56 turns and is on the other end of the slip ring SW1 and is about to leave the slip ring. The ball-bearing L2 is now on the slip ring SW1 and the ball-bearing L1 is on a land 21 so that when the ball-bearing K2 leaves the commutative slip ring SW1, the positive voltage output will be maintained.

Figures 5(*g*) and 5(*h*) show the ball-bearings K1 and L1 and K2 and L2 in corresponding positions after the ball-bearing K2 has completed a further 0.44 turns (i.e. one complete turn from the position shown in Figure 5(*d*)). The ball-bearing K2 is just coming on to the slip ring SW1 but will provide no positive voltage output because the ball-bearing K1 is one-fifth of a division away from the land 20. The ball-bearing L2 is just leaving the commutative slip ring SW1 and is about to cease providing a positive voltage output although the ball-bearing L1 is still upon the land 21. A positive voltage output is thus provided for exactly one complete turn of the ball-bearings K2 and L2 which, it will be remembered, are driven directly by shaft 2 of Figure 1.

As shown in Figure 5(*g*), the ball-bearing L1 is one-fifth of a division away from the end (indicated by the arrow 19H) of the land 21. Therefore, it will leave the land 21 after the ball-bearing L2 has completed only one-fifth of a further turn so that no further positive voltage output will be obtained from the commutative slip ring SW1 until the ball-bearings K2 and L2 have completed one turn from the position shown in Figure 5(*h*). The ball-bearings will then be in positions similar to those shown in Figures 5(*c*) and 5(*d*) and the sequence of operations will be repeated.

From the description with reference to Figures 3, 4 and 5, it will be seen that an output from the commutative slip ring SW1 representing the binary digit 1 will commence when the ball-bearings A1 to G1 (Figure 3) are in the middle of a division of the coarse commutator representing an even decimal digit and will end when the ball-bearings A1 to C1 are in the middle of the next division of the coarse commutator representing an odd decimal digit. Thus, the requirements of the cyclic permuting binary-decimal code are fulfilled. When the fine and coarse commutators are in the positions relative to the ball-bearings shown in Figures 2 and 3, the output from the encoder will be seen to represent 0101, 1110 representing the cyclic permuting decimal digits 05 and the normal decimal number 05. This indicates that the shaft 2 has rotated five-tenths of a revolution in an anti-clockwise direction from a datum position. However, if the reading had been taken just before the ball-bearing K2 had come on to the commutative slip ring SW1 (Figure 4) the output from the encoder would have represented the binary digits 0101, 0110. This represents the normal decimal number 04 indicating the rotation of four-tenths of a revolution of the shaft 2.

From the foregoing description, especially with reference to Figure 5, it will be seen that the coarse commutator 11 may be displaced (due to backlash in the gears) from its true position by up to one-fifth of a turn in either direction without the output from the encoder on the W1 channel being adversely affected.

Although the above-described digital encoder employs a cyclic permuting binary-decimal code, it will be apparent to those versed in the art that such an encoder may be easily adapted so as to utilize other codes employing binary digits. Further, although the commutators hereinbefore described each have only ten divisions in one complete turn, it will be understood that they are described by way of example only and in the interests of simplicity. Clearly, commutators having, for example one-hundred or even one-thousand divisions may be constructed by employing similar principles. To make these principles more clear, the spacing of the ball-bearings and the location and staggering of the lands of the coarse commutator have been described in terms of fractions of a turn and of divisions rather than in terms of angles.

Thus, for example, in the case of a coarse commutator having one-hundred divisions and rotating relative to the shaft one-hundredth of a revolution for each complete rotation of the shaft, there will be a number of tracks having 5 N equal lands equally spaced, where N is some integer (for example 1, 2 or 4) which may vary from one track to another. In the case of each of these tracks, the tracks may be read by means of two ball-bearings and a single slip-ring in a manner similar to that described with reference to Figure 5. In this case, the ball-bearings bearing on a track would be spaced apart by two-fifths of a turn (144 degrees) plus two-fifths of a division. That is to say, they would be spaced apart by 0.404 of a turn. The slip ring would in this case be (1.000–0.404)=0.596 of a turn long, this being the greater angular distance between the ball-bearings.

It will be realized that only in the case where the track representing the W binary digit in the representation of the most significant decimal digit represented on the fine commutator is transferred to the coarse commutator, does the change-over point (as illustrated by way of example in Figures 5(*c*) and (*d*) and 5(*g*) and (*h*) occur half-way between division boundaries of the coarse commutator. In all other cases, such change-over points would be arranged to occur at division bounderies of the coarse commutator. Some latitude is, of course, possible in the spacing of the ball-bearings and the corresponding length of the slip ring in order to accommodate various amounts of backlash in the gears. The spacing of the ball-bearings by two-fifths of a division greater than two-fifths of a turn (to allow for one-fifth of a division of error in either direction) has been chosen as an approximation to the optimum spacing.

The adaptation of the two-track and two slip-ring system, as exemplified by the tracks W2 and $W2^1$ in Figure 3 and the slip rings SW2 and $SW2^1$ in Figure 4, to other commutator arrangements will be obvious to those versed in the art. Clearly, the two tracks may be staggered in relation to their ball-bearings so that the ball-bearings associated with one track may bear on a land up to one division before the ball-bearing associated with the other track bears on a corresponding land. However, the choice of one-half of a division overlap of output from the ball-bearings bearing on the tracks has been chosen to allow for the maximum error due to backlash in the gears.

In order to facilitate description, the ball-bearings bearing against the commutators and slip rings have been shown in the drawings mainly arranged along radial lines adjacent the commutators in the embodiment hereinbefore described. Mechanical considerations, such as considerations of size may necessitate that the ball-bearings should be in a staggered relationship.

Clearly this may be accomplished by similarly staggering their associated commutator tracks and slip rings. Also, in the case where two commutator tracks are the same except for a rotational displacement, one track may be dispensed with by placing a second ball-bearing, similarly displaced on the other track. For example, in the case of the commutator 5 in Figure 2, the track Y1 may be dispensed with by placing the ball-bearing M2 diametrically opposite the ball-bearing M3 on the track Z1.

Further, a positive voltage source may be applied to the commutators through means other than the tracks U and V. For example, sufficient ball-bearings connected in parallel to the voltage source may be made to bear on the remaining tracks so that at least one bears on a land at all rotational positions of the commutator.

Another modification that may be made, if it is required to limit the dimensions of the encoder in the direction of the axis of the shaft 2, is to mount the fine commutator 5 on the periphery of the brush carrier 13 in the form of an annular ring, outputs being taken from the fine commutator by means of ball-bearings in a manner similar to that already described.

Yet a further modification may be obtained by making the coarse commutator linear. In this case the brush carrier and the commutative slip rings are also linear. The brush carrier may be moved directly by, say, the bed of a machine tool, the commutative slip rings remaining stationary. The coarse commutator is then driven relative to the brush carrier by means of a rack and pinion gear.

I claim:

1. A digital encoder including a shaft, a coarse commutator mounted for rotation about the longitudinal axis of said shaft and having a plurality of tracks thereon each marked with a succession of code elements in accordance with a predetermined code, gear means connecting said shaft to the coarse commutator and arranged to rotate the coarse commutator about the longitudinal axis of the shaft by one division relative to the shaft for each complete rotation of the shaft, reading means driven directly by said shaft for providing intermediate outputs dependent upon the rotational position of the coarse commutator relative to said shaft and selector means operated directly by said shaft for selecting final outputs from the intermediate outputs according to the rotational position of said shaft.

2. A digital encoder including a shaft, a coarse commutator mounted for rotation about the longitudinal axis of said shaft, a brush carrier driven directly by said shaft, gear means for rotating the coarse commutator relative to the carrier by one division for each revolution of the shaft, a first track on the commutator having conductive regions and non-conductive regions representing code elements in part of a predetermined code, a second track on the commutator having the same pattern of conductive and non-conductive regions as the first track, means for applying a voltage to the conductive regions of the tracks, a first brush located in the brush carrier and co-operating with the first track, a second brush located in the brush carrier and co-operating with the second track, the positional relationship between the first brush and the first track and the second brush and the second track being such that the first brush bears on a conductive region a fraction of a division, greater than the positional error due to backlash in the gears, before the second brush bears on a corresponding conductive region on the second track and selector means for selecting an output from the two brushes so that the said voltage which appears at a final output starts and finishes at the instants required by the code.

3. A digital encoder including a shaft, a coarse commutator mounted for rotation about the longitudinal axis of said shaft, a brush carrier driven directly by said shaft, gear means for rotating the coarse commutator relative to the carrier by one division for each revolution of said shaft, a track on the coarse commutator and having a repetitive pattern of conductive regions and non-conductive regions representing code elements in part of a predetermined code, means for applying a voltage to the conductive regions of the track, a first brush located in the brush carrier and co-operating with the track, a second brush in the brush carrier and co-operating with the track, the first brush having a positional relationship relative to the second brush so that the first brush bears on a conductive region before the second brush bears on a similar conductive region and selector means for selecting an output from the two brushes so that the said voltage which appears at a final output starts and finishes at the instants required by the code.

4. A digital encoder including a shaft, a coarse commutator, a plurality of reading means driven directly by the shaft to rotate therewith, gear means for obtaining relative rotation between the coarse commutator and the said plurality of reading means by one division of the coarse commutator for each revolution of said shaft, a first track on the coarse commutator marked with a succession of code elements in part of a predetermined code, a second track on the coarse commutator marked with the same succession of code elements as the first track, a first reading means of said plurality of reading means cooperating with the first track, a second reading means of said plurality of reading means cooperating with the second track, the positional relationship between the first reading means and the first track and the second reading means and the second track being such that the first reading means reads from any given position on the first track a fraction of a division, greater than the positional error due to backlash in the gears, before the second reading means reads from the corresponding position on the second track, and selector means for selecting an output from one or the other of the two reading means so that the selected output starts and finishes at the rotational positions of the shaft required by the code.

5. A digital encoder including a shaft, a coarse commutator, a brush carrier, gear means for obtaining relative rotation between the coarse commutator and the brush carrier by one division of the coarse commutator for each revolution of said shaft, a first track on the coarse commutator having conductive regions and non-conductive regions representing code elements in part of a predetermined code, a second track on the coarse commutator having the same pattern of conductive regions and non-conductive regions as the first track, means for applying a voltage to the conductive regions of the tracks, a first brush located in the brush carrier and cooperating with the first track, a second brush located in the brush carrier and cooperating with the second track, the positional relationship between the first brush and the first track and the second brush and the second track being such that the first brush bears on a conductive region a fraction of a division, greater than the positional error due to backlash in the gears, before the second brush bears on a corresponding conductive region on the second track, and selector means for selecting an output from the two brushes so that the output voltage which appears at a final output starts and finishes at instants required by the code.

6. A digital encoder including a shaft, a coarse commutator, a plurality of reading means driven directly by the shaft so as to rotate therewith, gear means for obtaining relative rotation between the coarse commutator and the said plurality of reading means by one division of the coarse commutator for each revolution of said shaft, a track on the coarse commutator and having a repetitive pattern of markings thereon representing code elements in part of a predetermined code, a first reading means of the said plurality of reading means cooperating with the track, a second reading means of the said plurality of reading means cooperating with the track, the first reading means having a positional relationship relative to the second reading means so that the first reading means reads from any given position on the track a fraction of a division, greater than the positional error due to backlash in the gears, before the second reading means reads from a similarly marked position on the track, and selector means for selecting an output from one or the other of the two reading means so that the selected output starts and finishes at the rotational positions of said shaft required by the code.

7. A digital encoder including a shaft, a coarse commutator mounted for rotation about the longitudinal axis of the said shaft and having a plurality of tracks thereon each having conductive regions and non-conductive regions representing code elements in accordance with a predetermined code, a brush carrier driven directly by the shaft, gear means connecting the said shaft to the coarse commutator and arranged to rotate the coarse commutator by one division relative to the brush carrier for each complete revolution of the shaft, a first set of brushes located in the brush carrier, a second set of brushes located in the brush carrier, each brush of the second set being connected to a separate brush of the first set, a first track and a second track of the said plurality of tracks and bearing the same pattern of conductive regions and non-conductive regions, a first brush of the said first set of brushes arranged to bear on the first track, a second brush of the first set of brushes arranged to bear on the second track, the positional relationship between the brushes and the tracks being such that the first brush bears on a conductive region on the first track one-half of a division before the second brush bears on a corresponding conductive region on the second track and a plurality of commutative slip rings each of which cooperates with at least one brush of the said second set of brushes.

8. A digital encoder including a shaft, a coarse commutator mounted for rotation about the longitudinal axis of the said shaft and having a plurality of tracks thereon each having conductive regions and non-conductive regions representing code elements in accordance with a predetermined code, a brush carrier driven directly by the shaft, gear means connecting the said shaft to the coarse commutator and arranged to rotate the coarse commutator by one division relative to the brush carrier for each complete revolution of the shaft, a first set of brushes located in the brush carrier, a second set of brushes located in the brush carrier, each brush of the second set being connected to a separate brush of the first set, a first track and a second track of the said plurality of tracks and bearing the same pattern of conductive regions and non-conductive regions, a first brush of the said first set of brushes arranged to bear on the first track, a second brush of the first set of brushes arranged to bear on the second track, the positional relationship between the brushes and the tracks being such that the first brush bears on a conductive region on the first track some fraction of a division, greater than the positional error due to backlash, before the second brush bears on a corresponding conductive region on the second track, a first commutative slip ring and a second commutative slip ring each occupying a circular arc of approximately 180 degrees, the said second set of brushes including a third brush connected to the said first brush and arranged to cooperate with the first slip ring and a fourth brush connected to the second brush and arranged to cooperate with the second slip ring and the positional relationship between the third brush and the fourth brush relative to the first slip ring and the second slip ring respectively being such that the first brush is connected to the first slip ring for approximately one-half revolution of the shaft and the second brush is connected to the second slip ring for approximately one-half revolution of the shaft, alternately.

9. A digital encoder as claimed in claim 1 and wherein the tracks are marked on the coarse commutator in the form of conductive regions and non-conductive regions and wherein the reading means comprises a brush carrier and a first set of brushes located in the brush carrier so that at least one separate brush bears on each track of the coarse commutator.

10. A digital encoder as claimed in claim 9 and wherein the selector means comprises a plurality of commutative slip rings and a second set of brushes located in the brush carrier so that each slip ring co-operates with at least one separate brush, each of the second set of brushes being connected to a corresponding brush in the first set of brushes.

11. A digital encoder as claimed in claim 10 and wherein the coarse commutator has a first track and a second track marked thereon, each track bearing the same pattern of code elements, and the first set of brushes includes a first brush arranged to bear on the first track and a second brush arranged to bear on the second track, the positional relationship between the brushes and the tracks being such that the first brush bears on a conductive region on the first track some fraction of a division greater than the positional error due to backlash, before the second brush bears on a corresponding conductive region on the second track.

12. A digital encoder as claimed in claim 10 and wherein the coarse commutator includes a track having a repetitive pattern of conductive regions and non-conductive regions representing code elements in part of a predetermined code, the brush carrier has located therein a first brush co-operating with the track and a second brush co-operating with the track so that the first brush bears on a conductive region before the second brush bears on a similar conductive region on the track and wherein the selector means includes a third brush located in the brush carrier and connected to the first brush, a fourth brush located in the brush carrier and connected to the second brush and a commutative slip ring co-operating with the third brush and the fourth brush so that the conductive regions of the track are connected to, and disconnected from, the slip ring at the angular positions of the shaft required by the code.

13. A digital encoder as claimed in claim 2 and wherein the coarse commutator comprises a conductive disc having the tracks marked on one face thereof in the form of lands and depressions, the depressions being filled with non-conductive material.

14. A digital encoder as claimed in claim 2 and wherein the positional relationship between the brushes and the tracks is such that the first brush bears on a conductive region one-half of a division before the second brush bears on a corresponding conductive region on the second track.

15. A digital encoder as claimed in claim 2 and wherein the selector means includes a first commutative slip ring and a second commutative slip ring each occupying a circular arc of approximately 180 degrees, a third brush connected to the first brush and arranged to co-operate with the first slip ring and a fourth brush connected to the second brush and arranged to co-operate with the second slip ring, the positional relationship between the third brush and the fourth brush relative to the first slip ring and the second slip ring respectively being such that the first brush is connected to the first slip ring for approximately one-half revolution of the shaft and the second brush is connected to the second slip ring for approximately one-half revolution of the shaft, alternately.

16. A digital encoder as claimed in claim 2 and wherein the coarse commutator has a plurality of tracks each having a succession of conductive regions and non-conductive regions conforming to code elements in a cyclic permuting binary-decimal code.

17. A digital encoder as claimed in claim 2 and wherein there is provided a fine commutator driven directly by said shaft, the said fine commutator having a plurality of tracks marked thereon each marked with a succession of code elements in accordance with the predetermined code.

18. A digital encoder as claimed in claim 17 and wherein the fine commutator has the tracks marked thereon in the form of conductive regions and non-conductive regions, means being provided for connecting the conductive regions to a predetermined voltage.

19. A digital encoder as claimed in claim 18 and wherein the tracks on the fine commutators are marked with a succession of code elements conforming to a cyclic permuting binary-decimal code.

20. A digital encoder as claimed in claim 19 and wherein the fine commutator is marked in the cyclic permuting binary decimal code partially to define $(2m+1)10^n$ fine divisions of rotation, where $m$ and $n$ are integers, and wherein the W binary digit in the representation of the most significant cyclic permuting decimal digit represented on the fine commutator is marked on the coarse commutator in such a manner as to allow for the effect of the gear means.

21. A digital encoder as claimed in claim 2 and wherein the gear means comprises a gear-wheel attached to said shaft, a gear-wheel attached to the coarse commutator and a toothed pinion in meshed engagement with both of the gear wheels.

22. A digital encoder as claimed in claim 3 and wherein the selector means includes a third brush located in the brush carrier and connected to the first brush, a fourth brush located in the brush carrier and connected to the second brush and a commutative slip ring co-operating with the third and fourth brushes.

23. A digital encoder as claimed in claim 22 and wherein the predetermined code is a cyclic-permuting binary-decimal code, there are 5N conductive regions of equal angular length and of equal spacing on the track, where N is an integer, the first brush is spaced from the second brush and the third brush is spaced from the fourth brush each by 144 degrees plus two-fifths of a division, and the commutative slip ring occupies an arc corresponding to the greater distance between the third brush and the fourth brush.

24. A digital encoder as claimed in claim 4 and wherein the tracks are marked on the coarse commutator in the form of conductive regions and non-conductive regions.

References Cited in the file of this patent

UNITED STATES PATENTS

| | | |
|---|---|---|
| 2,496,585 | Harper | Feb. 7, 1950 |
| 2,666,912 | Gow | Jan. 19, 1954 |
| 2,852,764 | Frothingham | Sept. 16, 1958 |